March 7, 1950     S. J. OLEJNICZAK     2,499,673
RULE COMPASS
Filed April 5, 1948
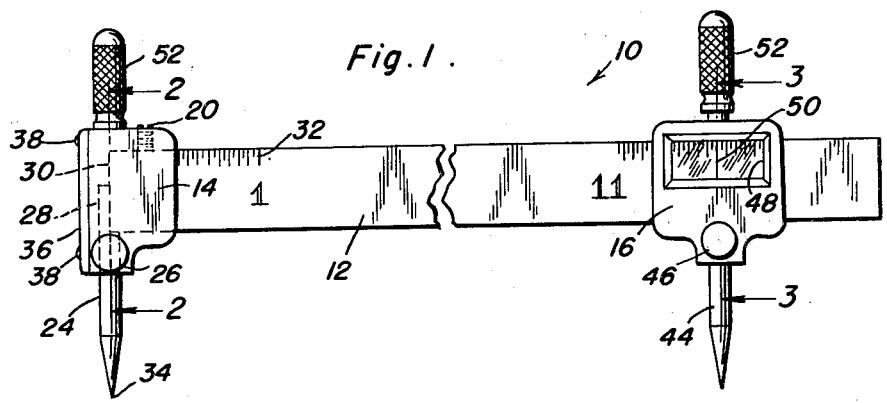
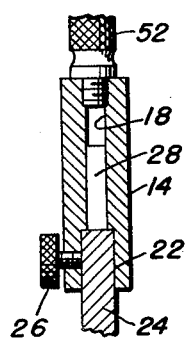
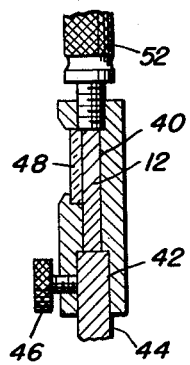
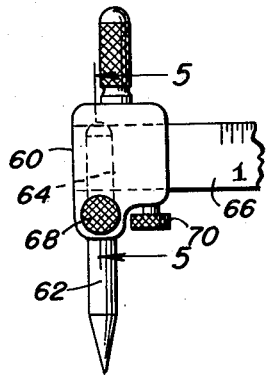
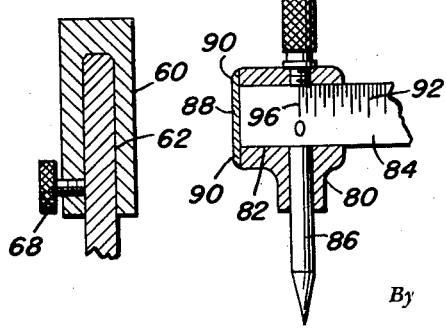
Inventor
Stephen J. Olejniczak
By *Clarence A. O'Brien and Harvey B. Jacobson*
Attorneys Patented Mar. 7, 1950

2,499,673

UNITED STATES PATENT OFFICE 2,499,673

RULE COMPASS

Stephen J. Olejniczak, Detroit, Mich.

Application April 5, 1948, Serial No. 19,048

1 Claim. (Cl. 33—158)

This invention relates to new and useful improvements and structural refinements in geometrical instruments, more specifically, compasses, and the principal object of the invention is to enable the user to quickly and accurately determine the radius to which the compass is set.

This object is achieved by the provision of what may be referred to as a beam compass, the beam portion of which assumes the form of a conventional ruler, usable with a pair of compass members, one of which is adjustable on the ruler or scale as required.

An important feature of the invention resides in detachable mounting of the compass members on the scale, whereby the scale may be employed per se, or in association with the compass members.

A still further feature of the invention resides in the provision of a rule compass which is simple in construction, which will readily lend itself to economical manufacture and which will not easily become damaged.

With the above more important objects and features in view and such other objects and features as may become apparent as this specification proceeds, the invention consists essentially of the construction and arrangement of parts as shown in the accompanying drawings in which:

Figure 1 is a side elevational view of the invention,

Figure 2 is a cross sectional view, taken substantially in the plane of the line 2—2 in Figure 1, Figure 3 is a cross sectional view, taken substantially in the plane of the line 3—3 in Figure 1, Figure 4 is a fragmentary elevational view showing a modified embodiment of the invention, Figure 5 is a cross sectional view, taken substantially in the plane of the line 5—5 in Figure 4, and Figure 6 is a fragmentary cross sectional view of a further modified embodiment of the invention.

Like characters of reference are employed to designate like parts in the specification and throughout the several views.

Referring now to the accompanying drawings in detail, more specifically, to Figures 1-3 inclusively, the invention consists of a rule compass designated generally by the reference character 10, the same embodying in its construction a suitable graduated beam on scale 12, a stationary compass member 14 and an adjustable compass member 16.

The compass member 14 assumes the form of a body formed with a transversely extending slot or recess 18 corresponding in width to the thickness of the beam 12, the beam being insertable in the slot 18 and being securable therein by means of a suitable set screw 20 provided in the body 14.

The body 14 is also formed with a substantially cylindrical bore constituting what may be referred to as a socket 22, this socket being intended to receive a suitable compass needle 24 which is securable therein by means of a further set screw 26 provided in the body 14.

It is to be noted that the socket 22 communicates with the recess or slot 18, and that the inner end portion of the needle 24 is formed integrally with a sectionally reduced portion 28 which projects into the slot 18 and abuts the end edge 30 of the beam 12.

It should be understood that one side face of the portion 28 is disposed in the plane of the longitudinal axis of the needle 24, and by virtue of this arrangement, after the needle is inserted in position in the socket 22, the beam 12 may be inserted in the slot 18 until it abuts the portion 28, thus assuring that the end edge 30 of the beam is aligned with the longitudinal axis of the needle. It is to be assumed that the "zero" index of the graduations 32 on the scale 12 coincides with the edge 30 thereof, whereby the zero index is also aligned with the point 34 of the needle 24.

If desired, a suitable end plate 36 may be secured as at 38 through the body 14, thereby closing one end of the slot 18 and "finishing" the appearance of the body.

The aforementioned adjustable compass member 16 also assumes the form of a relatively flat body provided with a transverse slot 40 to slidably accommodate the beam 12, the body of the member 16 also including a socket 42 wherein a suitable stylus 44 may be secured by means of a set screw 26.

The body of the member 16 is provided at one side thereof with a "window" 48 of transparent material, inscribed with a transversely extending hair line or indicator 50, with respect to which the graduations 32 on the scale 12 may be read.

For convenience in handling, both the member 14 and the member 16 may be provided with suitable hand knobs 52, as will be clearly apparent.

When the invention is placed in use, it is to be noted that since the point 34 of the needle 24 is aligned with the zero index at the end edge 30 of the scale 12, the radius of the compass may be quickly and easily determined by simply reading the scale with respect to the hair line 50, it being understood, of course, that the hair line is longitudinally aligned with the axis of the stylus 44.

Referring now to the modified embodiment of the invention illustrated in the accompanying Figure 4, the same is substantially similar to the embodiment already described, with exception of the stationary compass member 60, the needle 62 of which is of uniform cross sectional configuration at its inner end, and abuts an end edge 64 of a graduated beam or scale 66.

In this embodiment the graduations on the scale 66 are so arranged as to compensate for half the diameter of the needle 62, so that the zero index of the scale is coincident with the longitudinal axis of the needle, as will be clearly apparent.

The needle 62 is retained in the body 60 by a suitable set screw 68, and a further set screw 70 is employed for retaining the scale 66 in the body.

With reference to the further modified embodiment of the invention illustrated in the accompanying Figure 6, the stationary compass member 80 herein is formed with a transverse slot or recess 82 to accommodate an end portion of the beam 84, but the needle 86 used with the member 80 is sufficiently short and to permit the end edge of the scale 84 to abut an end plate 88 secured to the member 80 as at 90.

It is to be noted that in this embodiment of the invention, the graduations 92 on the scale 84 are so arranged that the zero index 96 is in alignment with the longitudinal axis of the needle 86, that is to say the graduations 92 do not extend to the end edge of the scale, as they do in the aforementioned scale 12.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a rule compass, the combination of a beam having a straight end edge, a compass member provided with a recess to removably receive an end portion of said beam, said member being formed with a bore communicating with an inner portion of said recess, a cylindrical compass element removably receivable in said bore, and a semi-cylindrical extension provided at the inner end of said element, said extension projecting into said recess and the flat surface thereof abutting and constituting a stop for the straight end edge of said beam to facilitate alignment of said edge with the axis of said element.

STEPHEN J. OLEJNICZAK.

REFERENCES CITED

The following references are of record in the file of this patent:

UNITED STATES PATENTS

| Number | Name | Date |
|---|---|---|
| 673,687 | Penfield | May 7, 1901 |
| 939,597 | Hurst | Nov. 9, 1909 |
| 1,166,512 | Dannenfelser | Jan. 4, 1916 |
| 1,321,312 | Jooss | Nov. 11, 1919 |
| 1,636,036 | Bartlett | July 19, 1927 |